US011477786B2

(12) United States Patent
Shin

(10) Patent No.: US 11,477,786 B2
(45) Date of Patent: Oct. 18, 2022

(54) METHOD AND AN APPARATUS FOR DETERMINING A LOCAL FREQUENCY IN WIRELESS COMMUNICATION SYSTEM

(71) Applicant: Samsung Electronics Co., Ltd., Suwon-si (KR)

(72) Inventor: Yisup Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 16/845,639

(22) Filed: Apr. 10, 2020

(65) Prior Publication Data

US 2020/0329474 A1    Oct. 15, 2020

(30) Foreign Application Priority Data

Apr. 12, 2019    (KR) ........................ 10-2019-0043170

(51) Int. Cl.
*H04W 72/04*    (2009.01)
*H04L 5/00*    (2006.01)
*H04L 27/26*    (2006.01)

(52) U.S. Cl.
CPC ....... *H04W 72/0453* (2013.01); *H04L 5/0037* (2013.01); *H04L 5/0044* (2013.01);
(Continued)

(58) Field of Classification Search
CPC ............ H04W 72/0453; H04L 5/0044; H04L 27/2647; H04L 5/0053; H04L 27/2602;
(Continued)

(56) References Cited

U.S. PATENT DOCUMENTS 6,690,735 B1 *    2/2004    Maddiotto ............. H03D 7/166
                                                                  375/260
8,260,215 B2    9/2012    Wenink et al.
(Continued)

FOREIGN PATENT DOCUMENTS

WO    2017082795 A1    5/2017
WO    2018048187 A1    3/2018
WO    2018064403 A1    4/2018

OTHER PUBLICATIONS

International Search Report and Written Opinion of the International Searching Authority in connection with International Application No. PCT/KR2020/004976 dated Jul. 17, 2020, 4 pages.
(Continued)

*Primary Examiner* — Un C Cho
*Assistant Examiner* — Yu-Wen Chang

(57) ABSTRACT

The disclosure relates to a communication scheme and system for converging a $5^{th}$ generation (5G) communication system for supporting a data rate higher than that of a $4^{th}$ generation (4G) system with an internet of things (IoT) technology. The disclosure is applicable to intelligent services (e.g., smart home, smart building, smart city, smart car or connected car, health care, digital education, retail, and security and safety-related services) based on the 5G communication technology and the IoT-related technology. A method for determining a local frequency in a wireless communication system includes identifying frequency bands in use for communication, identifying, based on a first frequency band being in use for communication, a first subcarrier located at the center of the first frequency band among multiple subcarriers constituting the first frequency band, and determining a frequency between the first subcarrier and a second subcarrier closest to the first subcarrier as the local frequency.

14 Claims, 12 Drawing Sheets

(52) U.S. Cl.
CPC ........ *H04L 5/0053* (2013.01); *H04L 27/2602* (2013.01); *H04L 27/2647* (2013.01)

(58) Field of Classification Search
CPC . H04L 5/0037; H04L 5/003; H04L 27/26025; H04L 27/2666; H04L 25/06; H04L 27/2601
See application file for complete search history.

(56) References Cited

U.S. PATENT DOCUMENTS

| | | | | |
|---|---|---|---|---|
| 2002/0173337 | A1* | 11/2002 | Hajimiri | H04B 1/005 455/552.1 |
| 2009/0154584 | A1 | 6/2009 | Kishiyama et al. | |
| 2010/0246702 | A1 | 9/2010 | Miyoshi | |
| 2010/0248669 | A1* | 9/2010 | Jerng | H04B 1/0067 455/232.1 |
| 2011/0057837 | A1* | 3/2011 | Lin | G01S 19/32 342/357.72 |
| 2013/0028214 | A1* | 1/2013 | Imamura | H04W 52/346 370/329 |
| 2014/0269855 | A1* | 9/2014 | Mayer | H04L 27/2657 375/219 |
| 2015/0146640 | A1* | 5/2015 | Baldemair | H04L 27/2665 370/329 |
| 2016/0072614 | A1* | 3/2016 | Blankenship | H04W 72/0453 370/329 |
| 2016/0105803 | A1* | 4/2016 | Sakhnini | H04L 5/0044 455/45 |
| 2017/0033821 | A1* | 2/2017 | Huang | H04B 1/00 |
| 2017/0187509 | A1* | 6/2017 | Li | H04B 1/0057 |
| 2018/0035416 | A1* | 2/2018 | Yi | H04W 72/044 |
| 2018/0146482 | A1 | 5/2018 | Hamaguchi | |
| 2018/0242322 | A1 | 8/2018 | Jin et al. | |
| 2020/0259548 | A1* | 8/2020 | Li | H04B 1/30 |
| 2021/0160121 | A1* | 5/2021 | Jeon | H04J 11/0023 |
| 2021/0266197 | A1* | 8/2021 | Ostman | H04L 5/0048 |

OTHER PUBLICATIONS

European Patent Office, "Supplementary European Search Report" dated Apr. 8, 2022, in connection with European Patent Application No. 20788520.3, 11 pages.

Huawei et al: "Discussion on DC location", R4-1709551, 3GPP TSG-RAN WG4 Meeting NR ad-hoc #3, Nagoya, Japan, Sep. 18-21, 2017, 3 pages.

Panasonic: "Discussion on frequency domain frame structure for NR", R1-1611892, 3GPP TSG RAN WG1 Meeting #87, Reno, USA, Nov. 14-18, 2016, 5 pages.

Panasonic: "Remaining issues on NR frame structure focusing on frequency domain", R1-1702303, 3GPP TSG RAN WG1 Meeting #88, Athens, Greece, Feb. 13-17, 2017, 6 pages.

\* cited by examiner

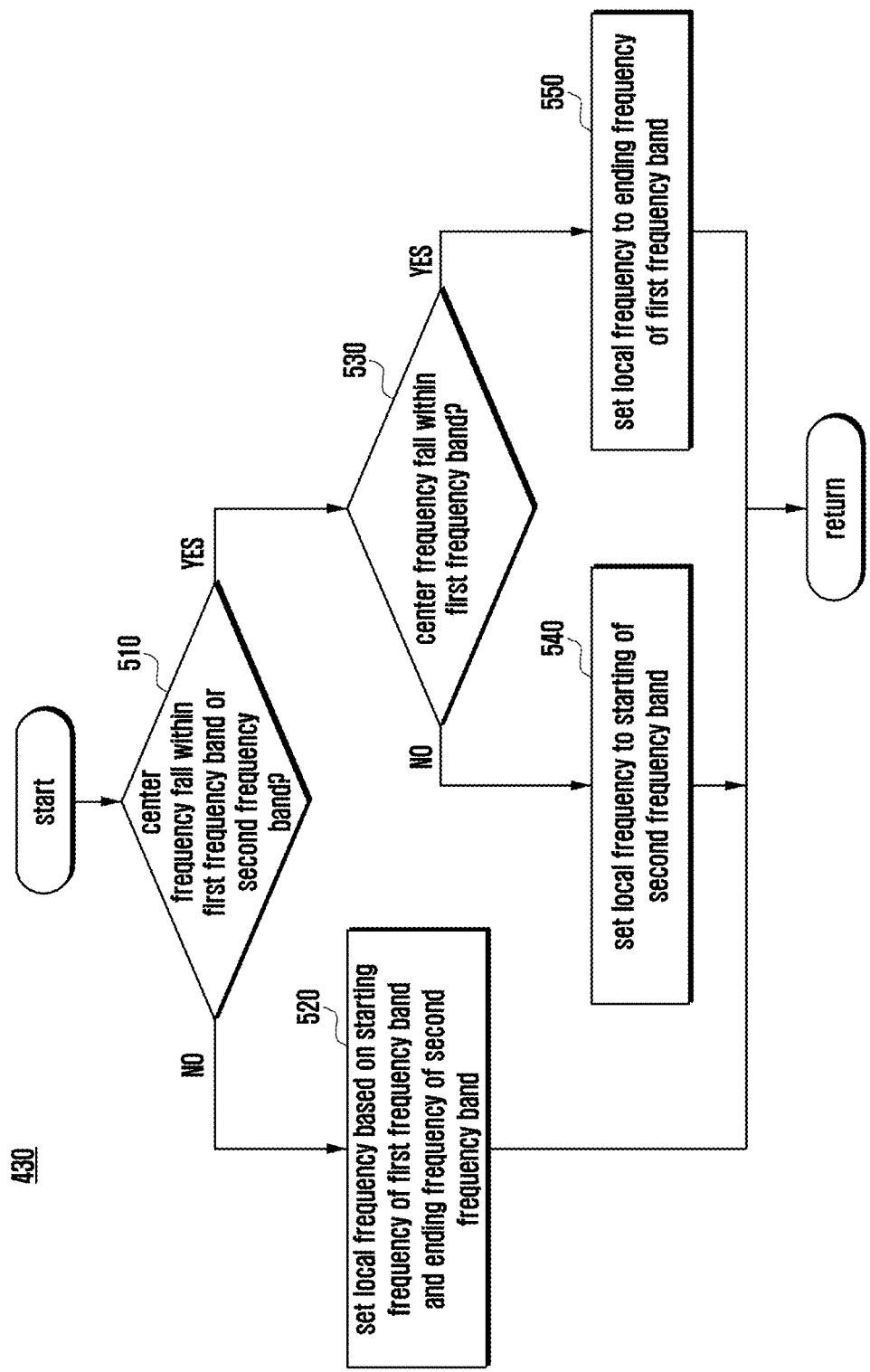

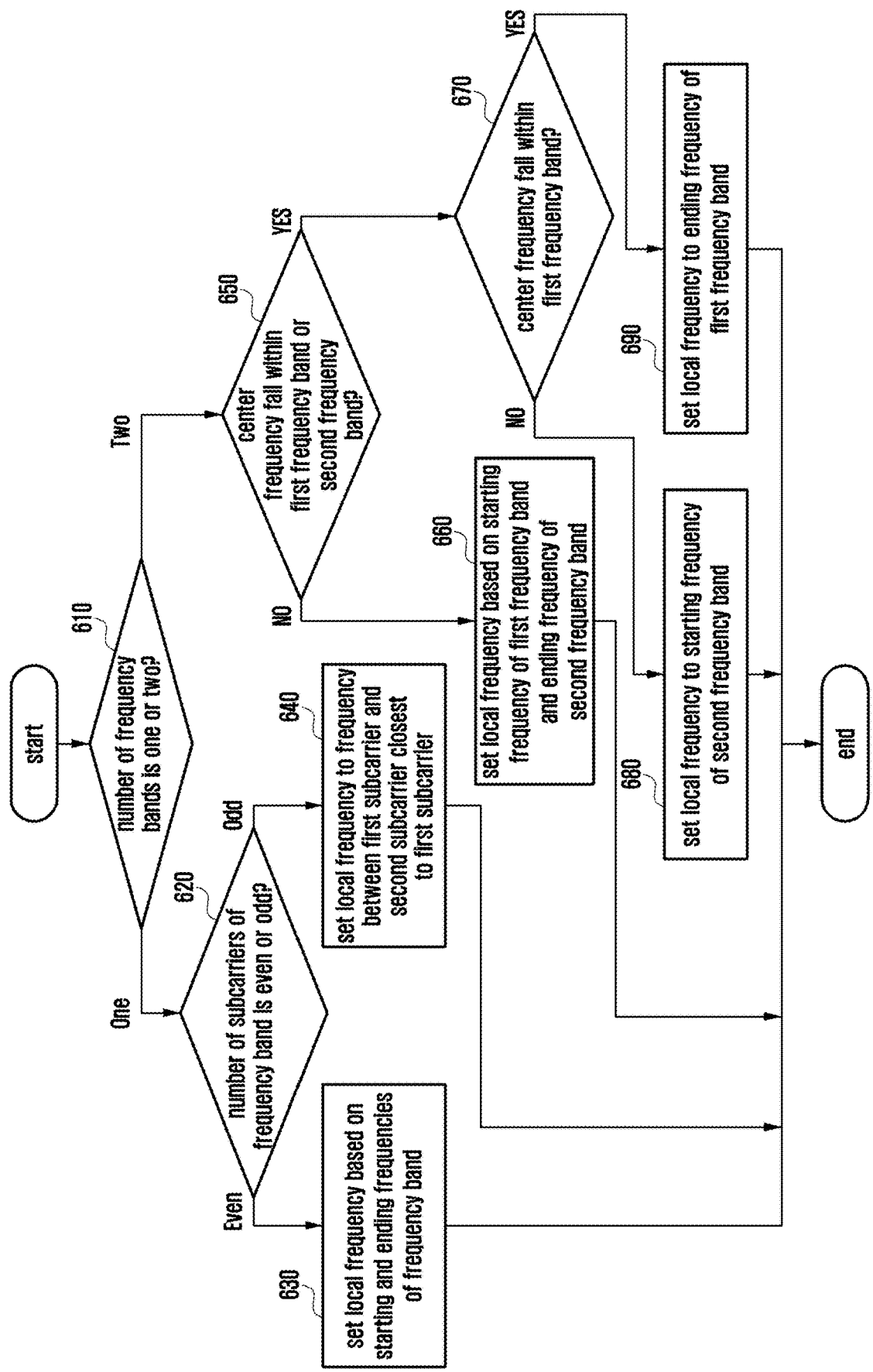

METHOD AND AN APPARATUS FOR DETERMINING A LOCAL FREQUENCY IN WIRELESS COMMUNICATION SYSTEM

CROSS-REFERENCE TO RELATED APPLICATION

This application is based on and claims priority under 35 U.S.C. 119 to Korean Patent Application No. 10-2019-0043170 filed on Apr. 12, 2019 in the Korean Intellectual Property Office, the disclosure of which is herein incorporated by reference in its entirety.

BACKGROUND

1. Field

The disclosure relates to a method and apparatus for determining a local frequency for use in changing a frequency in a wireless communication system.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology," "wired/wireless communication and network infrastructure," "service interface technology," and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

SUMMARY

A mixer is a device for changing a frequency of a signal using a local frequency, and the local frequency is typically a frequency that becomes the center frequency of the signal. Meanwhile, in a 5G mobile communication system, the direct current (DC) component may include a subcarrier. This means that performing a mixing operation, in the state where the DC component includes a subcarrier, may locate the local frequency at the center of the corresponding subcarrier. The local frequency located at the center of the subcarrier is likely to cause a signal distortion effect.

A disclosed embodiment provides a method for determining a local frequency in a wireless communication system. The method includes identifying frequency bands in use for communication, identifying, based on a first frequency band being in use for communication, a first subcarrier located at the center of the first frequency band among multiple subcarriers constituting the first frequency band, and determine a frequency between the first subcarrier and a second subcarrier closest to the first subcarrier as the local frequency.

A disclosed embodiment provides an electronic device. The electronic device includes a transceiver; a controller electrically connected with the transceiver and configured to identify frequency bands in use for communication, identify, based on a first frequency band being in use for communication, a first subcarrier located at the center of the first frequency band among multiple subcarriers constituting the first frequency band, and determine a frequency between the first subcarrier and a second subcarrier closest to the first subcarrier as the local frequency; and a memory electrically connected with the controller and configured to store information generated by the controller or transmitted or received by the transceiver.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5A illustrates a flowchart of the location of a local frequency when the center frequency is not located in both the first and second frequency band according to a disclosed embodiment;

FIG. 6 illustrates a flowchart of a local frequency determination method according to a disclosed embodiment.

DETAILED DESCRIPTION

Figure 1:
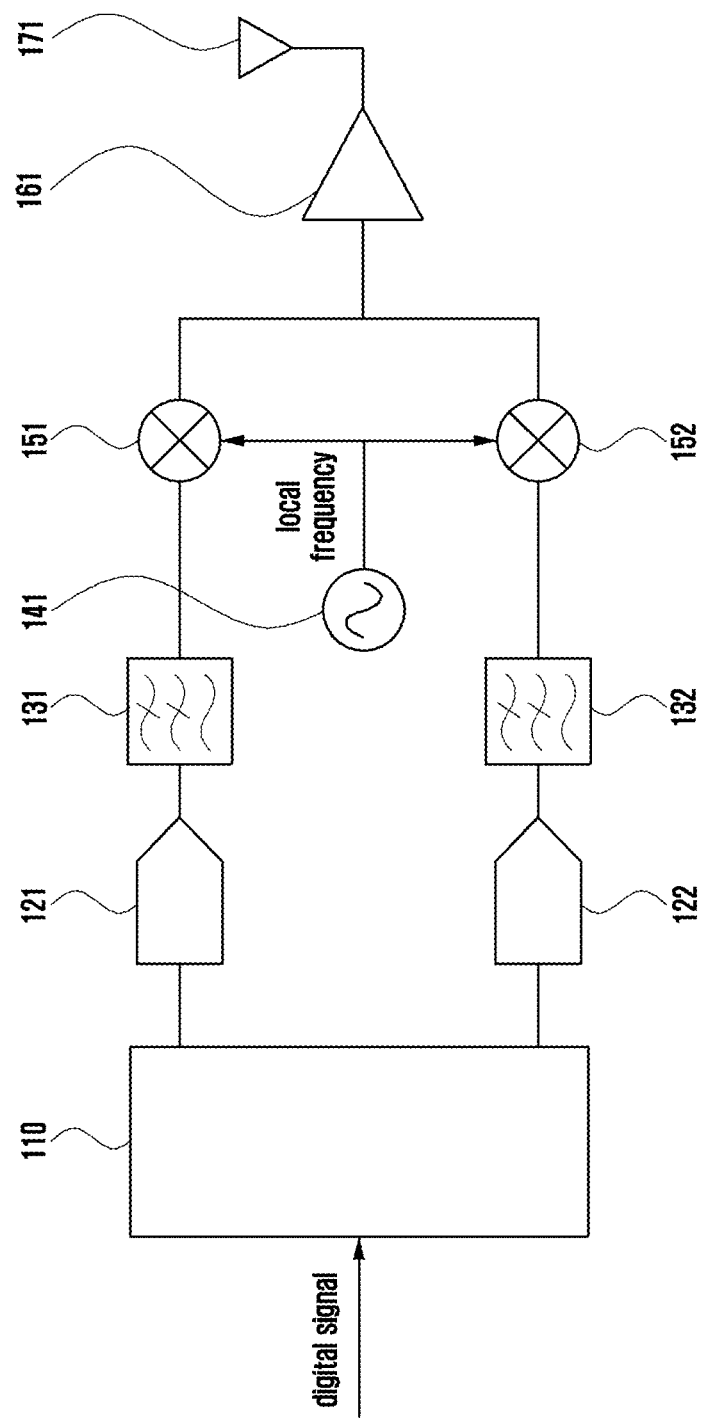
FIG. 1 illustrates a diagram of a frequency conversion procedure using a local frequency.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

FIG. 1 illustrates a diagram of a frequency conversion procedure using a local frequency.

According to an embodiment, a digital signal may be input to a digital signal processor (DSP) 110. According to various embodiments, the DSP 110 may be an integrated circuit configured to enable the electronic device to quickly process the digital signal.

According to an embodiment, a signal output from the DSP 110 may be input to at least one digital-to-analog converter (DAC) (DACs 121 and 122 in FIG. 1). According to various embodiments, the at least one DAC (DACs 121 and 122 in FIG. 1) may convert the digital signal input from the DSP 110 to an analog signal.

According to an embodiment, signals output from the DACs 121 and 122 are input to the low pass filters (LPFs) 131 and 132 corresponding to the DACs 121 and 122. According to various embodiments, the LPFs 131 and 132 may filter low frequency band components of the signals output from the DACs 121 and 122.

According to an embodiment, the signals filtered through the LPFs 131 and 132 may be input to corresponding mixers 151 and 152. According to various embodiments, the mixers 151 and 152 may receive a local frequency generated by a generator 141.

According to an embodiment, the local frequencies that are respectively provided to the first and second mixers 151 and 152 may differ in phase. For example, the local frequencies for the first and second mixers 151 and 152 may be 90° apart in phase.

According to an embodiment, the frequencies output by the first and second mixers 151 and 152 may be input to an amplifier 161. According to various embodiments, the signals amplified by the amplifier 161 may be transmitted outside the electronic device by means of an antenna 171.

Figure 2:
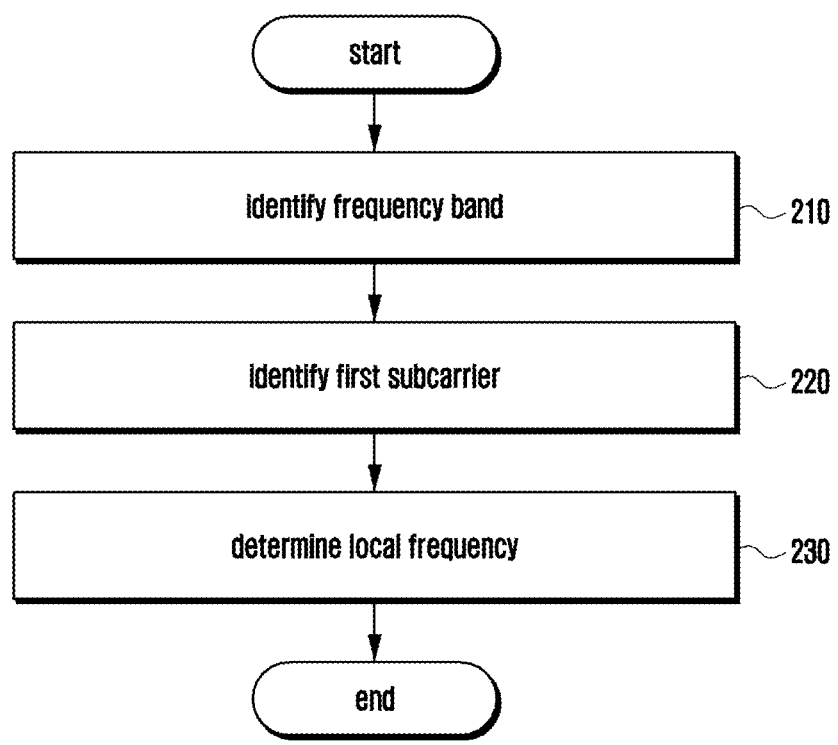
FIG. 2 illustrates a flowchart of a local frequency determination method according to a disclosed embodiment.

FIG. 2 illustrates a flowchart of a local frequency determination method according to a disclosed embodiment.

The embodiment of FIG. 2 shows a procedure for an electronic device to determine a local frequency. For example, a terminal or a base station may perform the operations depicted in FIG. 2 to determine the local frequency.

According to an embodiment, the electronic device may identify, at operation 210, frequency bands in use for communication. According to various embodiments, the electronic device may perform communication using at least one frequency band. For example, the electronic device may perform communication using one frequency band or two frequency bands, e.g., first and second frequency bands.

According to an embodiment, the frequency bands may be the frequency bands in use by a 5G mobile communication system. For example, in the case where the electronic device uses two frequency bands, e.g., first and second frequency bands, for communication, the first frequency band may be a frequency band below 6 GHz while the second frequency band may be a frequency band above 6 GHz. According to various embodiments, the subcarrier spacing may be 13 kHz, 30 kHz, or 60 kHz in the first frequency band and 60 kHz or 120 kHz in the second frequency band.

According to an embodiment, if one frequency band to be used for communication is identified at operation 210, the electronic device may identify, at operation 220, a subcarrier located at the center of the frequency band among multiple subcarriers constituting the frequency band as a first subcarrier. For example, assuming that a frequency band consists of 5 subcarriers, the subcarrier located in the third place may be identified as the first subcarrier.

According to an embodiment, the electronic device may determine, at operation 230, a frequency between the first subcarrier and a second subcarrier closest to the first subcarrier as the local frequency. In the above example in which the subcarrier located in the third place is the first subcarrier, the electronic device may determine a frequency between the subcarriers located in the second and third places or between the subcarriers located in the third and fourth places as the local frequency. Hereinafter, the detailed description of the method for determining the local frequency is made with reference to FIGS. 3A to 3C.

Figure 3A:
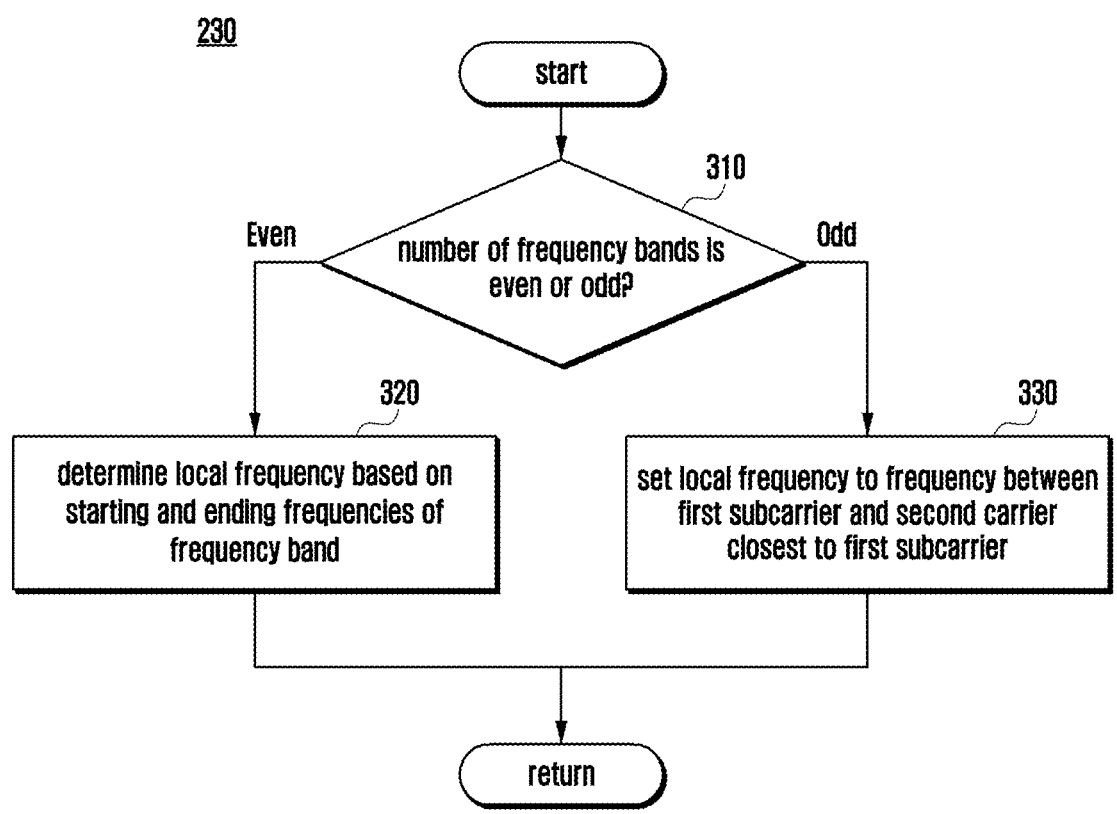
FIG. 3A illustrates a flowchart of a local frequency determination procedure in a situation where one frequency band is used for communication according to a disclosed embodiment.

FIG. 3A illustrates a flowchart of a local frequency determination procedure in a situation where one frequency band is used for communication according to a disclosed embodiment.

The embodiment of FIG. 3A shows a procedure for an electronic device to determine a local frequency. For example, a terminal or a base station may perform the operations depicted in FIG. 3A to determine the local frequency.

According to an embodiment, the electronic device may determine at operation 310 whether a subcarrier is arranged in the DC component. According to various embodiments, a frequency band consists of at least one subcarrier having a subcarrier spacing that varies with the frequency band. For example, the subcarrier spacing may be 3 kHz, 30 kHz, or 60 kHz in a frequency band below 6 GHz and 60 kHz or 120 kHz in a frequency band above 6 GHz.

According to an embodiment, if it is determined that no subcarrier is arranged in the DC component, the electronic device may determine, at operation 320, the local frequency based on the starting and ending frequencies of the frequency band. According to various embodiments, the local frequency may be determined by dividing the sum of the starting and ending frequencies of the frequency band by 2. For example, assuming a frequency band consisting of 6 subcarriers between the starting frequency of 1 GHz and the ending frequency of 1.2 GHz, the local frequency becomes 1.1 GHz. According to an embodiment, assuming a frequency band consisting of 6 subcarriers, a frequency component between the subcarriers located in the third and fourth places may be determined as the local frequency.

According to an embodiment, if it is determined that a subcarrier is arranged in the DC component, the electronic device may determine, at operation 330, a frequency between a first subcarrier and a second subcarrier closest to the first subcarrier as the local frequency. According to various embodiments, the first subcarrier may be the subcarrier located at the center of the frequency band. For example, assuming a frequency band consisting of 7 subcarriers, the first subcarrier may be the subcarrier located at the fourth place in the frequency band. According to an embodiment, assuming a frequency band consisting of 7 subcarriers, a frequency between the subcarriers located at the third and fourth places or between the subcarriers located at the fourth and fifth places in the frequency band may be determined as the local frequency.

In the embodiment of FIG. 3A, it may be possible to prevent the local frequency from being arranged in the DC component.

Figure 3B:
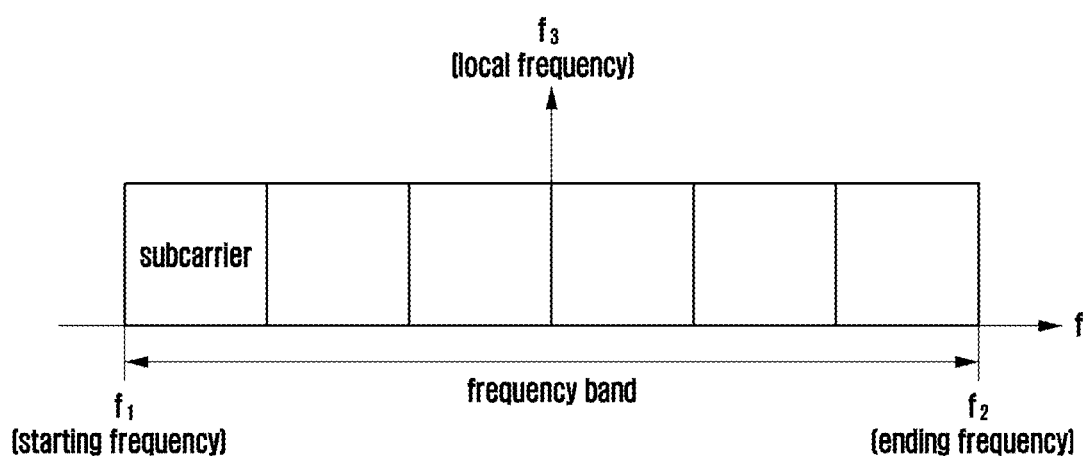
FIG. 3B illustrates a diagram of the location of a local frequency when an even number of subcarriers is included in a frequency band according to a disclosed embodiment.

FIG. 3B illustrates a diagram for explaining a procedure for determining a local frequency in a situation where no subcarrier is arranged in the DC component according to a disclosed embodiment.

According to an embodiment, in the case where only one frequency band is used for communication, the electronic device may determine the local frequency in the frequency band. According to various embodiments, assuming a frequency band consisting of 6 subcarriers, a frequency component between the subcarriers located at the third and fourth places may become the local frequency $f_3$.

According to an embodiment, in the case of communicating in a frequency band in which no subcarrier is arranged in the DC component, the electronic device may determine the local frequency $f_3$ using Equation 1.

$$f_3=(f_1+f_2)/2 \quad \text{[Equation 1]}$$

Figure 3C:
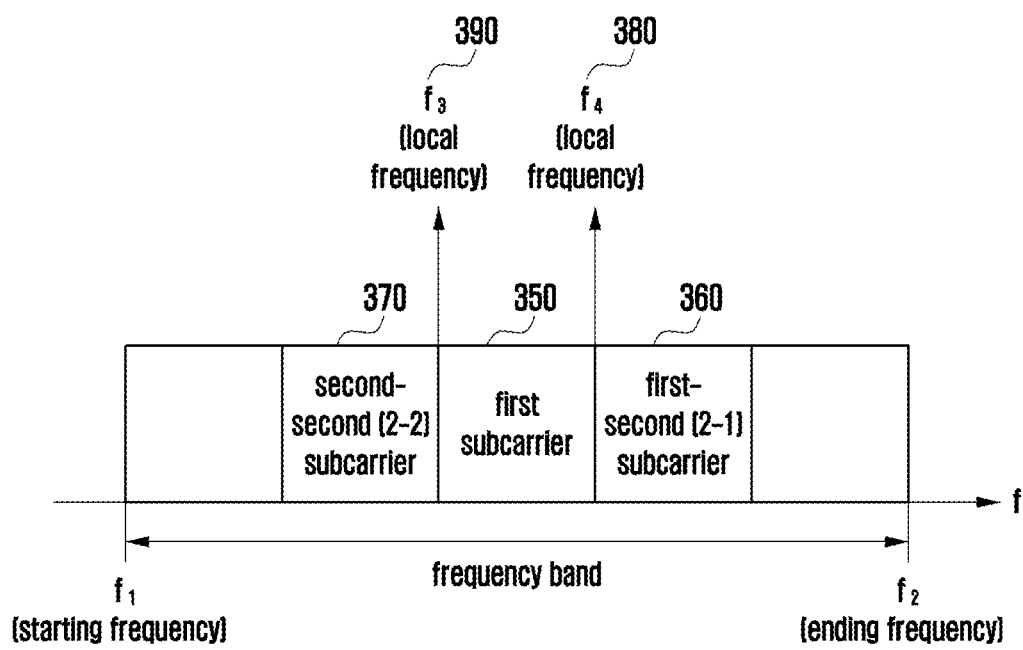
FIG. 3C illustrates a diagram of the location of a local frequency when an odd number of subcarriers is included in a frequency band according to a disclosed embodiment.

$f_1$: starting frequency of frequency band, $f_2$: ending frequency of frequency band, $f_3$: local frequency FIG. 3C illustrates a diagram of a procedure for determining a local frequency in a situation where a subcarrier is arranged in the DC component according to a disclosed embodiment.

According to an embodiment, in the case where only one frequency band is used for communication, the electronic device may determine the local frequency in the frequency band. According to various embodiments, assuming a frequency band consisting of 5 subcarriers, a frequency component $f_4$ 380 between a first subcarrier 350, which is located at the center of the frequency band, and a first-second (2-1) subcarrier 360 closest to the first subcarrier 350 or a frequency component $f_3$ 390 between the first subcarrier 350 and a second-second (2-2) subcarrier 370 closest to the first subcarrier 350 may become the local frequency.

According to an embodiment, in the case of communicating in a frequency band in which a subcarrier is arranged in the DC component, the electronic device may determine the local frequency using Equation 2. According to various embodiments, one of the frequency component $f_4$ 380 between the first subcarrier 350 and the first-second (2-1) subcarrier 360 closest to the first subcarrier 350 and the frequency component $f_3$ 390 between the first subcarrier 350 and the second-second (2-2) subcarrier 370 is determined as the local frequency, which makes it possible to maintain the orthogonality of orthogonal frequency division multiplexing (OFDM) symbols.

$$f_{LO}=(f_1+f_2)/2 \pm (S/2)*n \quad \text{[Equation 2]}$$

Figure 4:
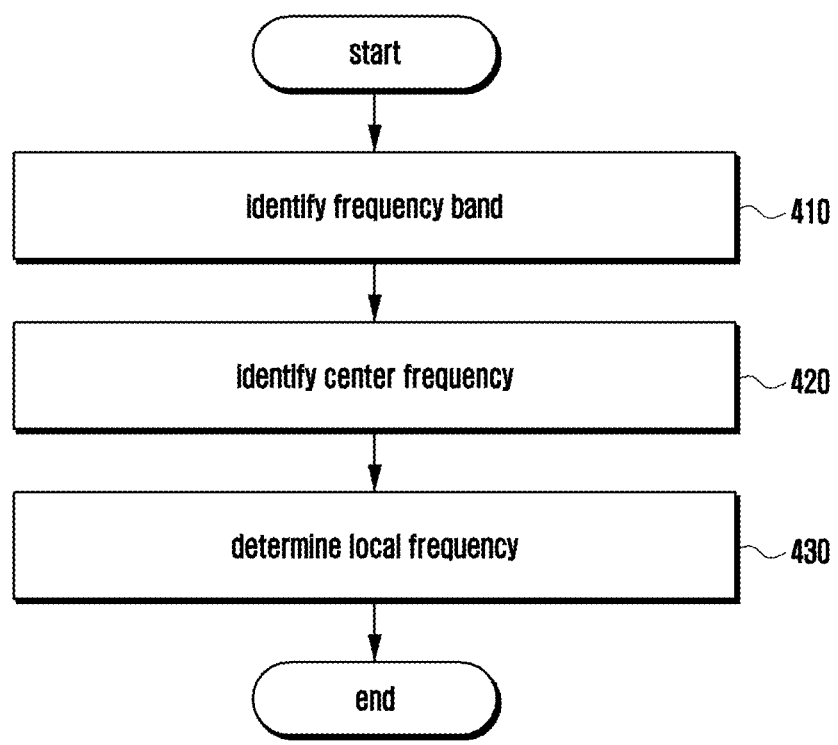
FIG. 4 illustrates a flowchart of a local frequency determination method in a situation where two frequency bands are used for communication according to a disclosed embodiment.

$f_1$: starting frequency of frequency band, $f_2$: ending frequency of frequency band, $f_3$: local frequency, n: integer, S: subcarrier spacing FIG. 4 illustrates a flowchart of a local frequency determination method in a situation where two frequency bands are used for communication according to a disclosed embodiment.

The embodiment of FIG. 4 shows a procedure for an electronic device to determine a local frequency. For example, a terminal or a base station may perform the operations depicted in FIG. 4 to determine the local frequency.

According to an embodiment, the electronic device may identify, at operation 410, frequency bands in use for communication. According to various embodiments, the electronic device may perform communication in at least one frequency band. For example, the electronic device may perform communication using one or two frequency bands, e.g., first and second frequency bands.

According to an embodiment, the frequency bands may be the frequency bands in use by a 5G mobile communication system. For example, in the case where the electronic device use two frequency bands, e.g., first and second frequency bands, for communication, the first frequency band may be a frequency band below 6 GHz while the second frequency band may be a frequency band above 6 GHz. According to various embodiments, the subcarrier spacing may be 13 kHz, 30 kHz, or 60 kHz in the first frequency band and 60 kHz or 120 kHz in the second frequency band.

According to an embodiment, if the first and second frequency bands to be used for communication are identified at operation 410, the electronic device may identify, at operation 420, a center frequency located at the center of a frequency range across the first and second frequency bands.

According to an embodiment, the first frequency band may be below the second frequency band, and the electronic device may determine the center frequency based on the starting frequency of the first frequency band and the ending frequency of the second frequency band. According to various embodiments, the electronic device may determine the center frequency using Equation (3).

$$f_c=(f_1+f_2)/2 \quad \text{[Equation 3]}$$

$f_1$: starting frequency of frequency band, $f_2$: ending frequency of frequency band, $f_c$: local frequency According to an embodiment, the electronic device may determine, at operation 430, the center frequency identified at operation 420 as the local frequency. According to an embodiment, the center frequency identified at operation 420 may be determined as the local frequency. Hereinafter, the detailed description of the method for determining the local frequency is made with reference to FIGS. 5A to 5D.

FIG. 5A illustrates a flowchart of the detailed procedure of the local frequency determination operation of FIG. 4 in a situation where the two frequency bands are used for communication according to a disclosed embodiment.

The embodiment of FIG. 5A shows a procedure for an electronic device to determine a local frequency. For example, a terminal or a base station may perform the operations depicted in FIG. 5A to determine the local frequency.

According to an embodiment, the electronic device may determine at operation 510 whether the center frequency falls within a first frequency band or a second frequency band. According to various embodiments, the first frequency band may be below the second frequency band. For example, the first frequency band ranges from 1 GHz to 1.2 GHz, and the second frequency band ranges from 2 GHz to 2.1 GHz.

According to an embodiment, if it is determined that the center frequency does not fall within either the first frequency band or the second frequency band, the electronic device may determine, at operation 520, the local frequency based on the starting frequency of the first frequency band and the ending frequency of the second frequency band. According to various embodiments, the center frequency may be determined by dividing the sum of the starting frequency of the first frequency band and the ending frequency of the second frequency by 2. For example, assuming that the starting frequency of the first frequency band and the ending frequency of the second frequency band are 1 GHz and 2 GHz respectively, the center frequency may be 1.5 GHz=((1 GHz+2 GHz)/2). Operation 520 is later described in more detail with reference to FIG. 5B.

According to an embodiment, if it is determined that the center frequency falls within the first frequency band or the second frequency band, the electronic device may determine at operation 530 whether the center frequency falls within the first frequency band. According to various embodiments, if it is determined that the center frequency does not fall within the first frequency band (i.e., if the center frequency falls within the second frequency band), the electronic device may determine, at operation 540, the starting frequency of the second frequency band as the local frequency. Operation 540 is later described in more detail with reference to FIG. 5D.

According to an embodiment, if it is determined that the center frequency falls within the first frequency band, the electronic device may determine, at operation 550, the ending frequency of the first frequency band as the local frequency. Operation 550 is later described in more detail with reference to FIG. 5C.

The flowchart of FIG. 5A illustrates just an exemplary embodiment of the local frequency determination procedure, and the scope of the disclosure is not limited to the flowchart of FIG. 5A. For example, the electronic device may perform the local frequency determination procedure in such a way of determining whether the center frequency falls within the second frequency band, determining, if the center frequency does not fall within the second frequency band, whether the center frequency falls within the first frequency band, and determining, if the center frequency is not located within either the first frequency band or the second frequency band, the local frequency based on the starting frequency of the first frequency band and the ending frequency of the second frequency band.

Figure 5B:
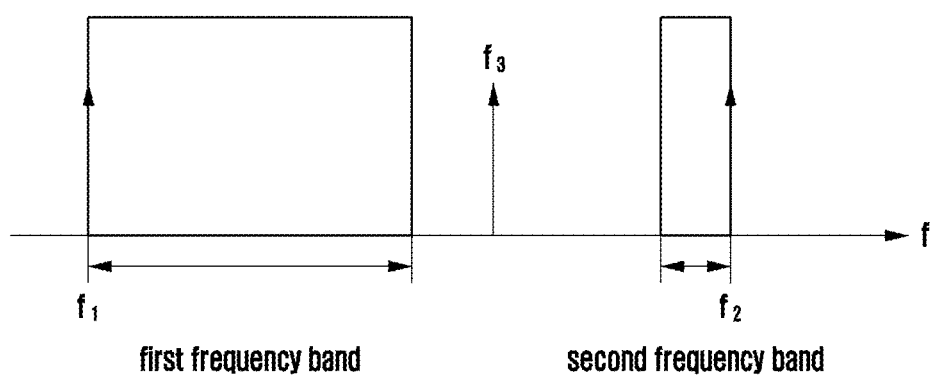
FIG. 5B illustrates a diagram of the location of a local frequency when the center frequency is not located in both the first and second frequency band according to a disclosed embodiment.

FIG. 5B illustrates a diagram for explaining the local frequency determination operation of FIG. 5A in the case where the center frequency does not fall within either the first frequency band or the second frequency band according to a disclosed embodiment.

According to an embodiment, the first frequency band may be below the second frequency band. According to various embodiments, the starting frequency of the first frequency band may be $f_1$, and the ending frequency of the second frequency band may be $f_2$. According to an embodiment, the center frequency $f_3$ may be determined by dividing the sum of the starting frequency $f_1$ of the first frequency band and the ending frequency $f_2$ of the second frequency band by 2.

According to an embodiment, the center frequency $f_3$ may not fall within either the first frequency band or the second frequency band. According to various embodiments, if the center frequency does not fall within either the first frequency band or the second frequency band, this may reduce the signal distortion effect. According to an embodiment, if the center frequency does not fall within either the first frequency band or the second frequency band as shown in FIG. 5B, the electronic device may determine the center frequency $f_3$ as the local frequency.

Figure 5C:
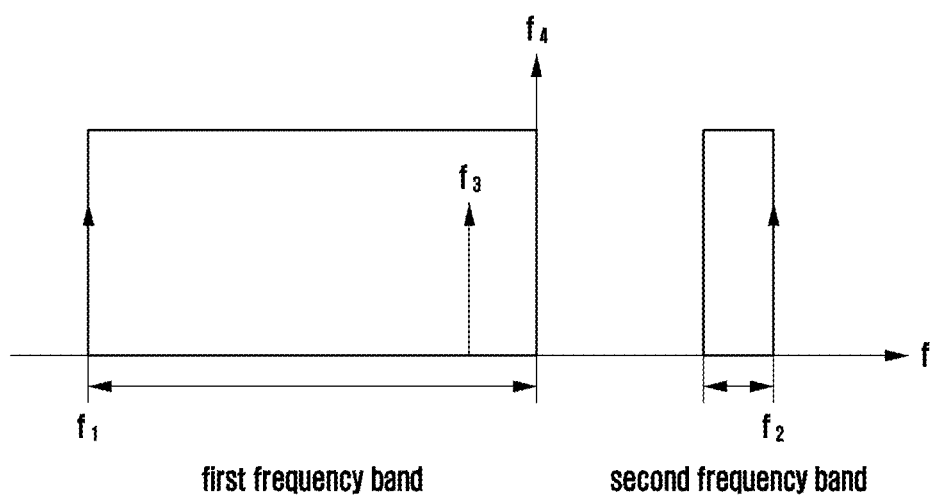
FIG. 5C illustrates a diagram of a location of a local frequency when a center frequency is included in a first frequency band according to a disclosed embodiment.

FIG. 5C illustrates a diagram for explaining the local frequency determination operation of FIG. 5A in the case where the center frequency falls within the first frequency band according to a disclosed embodiment.

According to an embodiment, the first frequency band may be below the second frequency band. According to various embodiments, the starting frequency of the first frequency band may be $f_1$, and the ending frequency of the second frequency band may be $f_2$. According to an embodiment, the center frequency $f_3$ may be determined by dividing the sum of the starting frequency $f_1$ of the first frequency band and the ending frequency $f_2$ of the second frequency band by 2.

According to an embodiment, the center frequency $f_3$ may fall within the first frequency band. According to various embodiments, if the bandwidth of the first frequency band is wider than the bandwidth of the second frequency band and the first and second frequency bands are close to each other, the center frequency $f_3$ may fall within the first frequency band.

According to an embodiment, if the electronic device determines the center frequency $f_3$ falling within the first frequency band as the local frequency, this may cause a signal distortion effect leading to a loss of orthogonality between OFDM symbols. According to various embodiments, the electronic device may determine the ending frequency $f_4$ of the first frequency band as the local frequency to avoid a signal distortion and preserve the orthogonality between OFDM symbols.

Figure 5D:
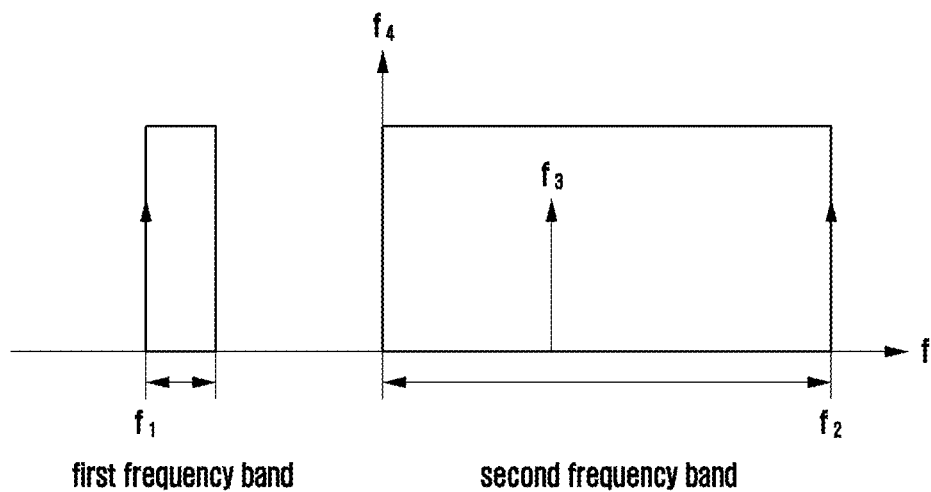
FIG. 5D illustrates a diagram of the location of a local frequency when the center frequency is included in the second frequency band according to a disclosed embodiment.

FIG. 5D illustrates a diagram for explaining the local frequency determination operation of FIG. 5A in the case where the center frequency falls within the second frequency band.

According to an embodiment, the first frequency band may be below the second frequency band. According to various embodiments, the starting frequency of the first frequency band may be $f_1$, and the ending frequency of the second frequency band may be $f_2$. According to an embodiment, the center frequency $f_3$ may be determined by dividing the sum of the starting frequency $f_1$ of the first frequency band and the ending frequency $f_2$ of the second frequency band by 2.

According to an embodiment, the center frequency may fall within the second frequency band. According to various embodiments, if the bandwidth of the second frequency band is wider that the bandwidth of the first band and the first and second frequency bands are close to each other, the center frequency $f_3$ may fall within the second frequency band.

According to an embodiment, if the electronic device determines the center frequency $f_3$ falling within the second frequency band as the local frequency, this may cause a signal distortion effect leading to a loss of orthogonality between OFDM symbols. According to various embodiments, the electronic device may determine the starting frequency $f_4$ of the second frequency band as the local frequency to avoid a signal distortion and preserve the orthogonality between OFDM symbols.

FIG. 6 illustrates a flowchart of a local frequency determination method according to a disclosed embodiment.

The embodiment of FIG. 6 shows a procedure for an electronic device to determine a local frequency. For example, a terminal or a base station may perform the operations depicted in FIG. 6 to determine the local frequency.

According to an embodiment, the electronic device may check, at operation 610, a number of frequency bands in use for communication. For example, the number of frequency bands for use in communication may be 1 for the case where the electronic device supports communication in only one frequency band ranging from 1 GHz to 1.1 GHz and 2 for the case where the electronic device supports communication in two frequency bands, one ranging from 1 GHz to 1.1 GHz and the other ranging from 2 GHz to 2.3 GHz.

According to an embodiment, if it is determined that the number of frequency bands in use for communication is 1, the electronic device may determine at operation 620 whether a subcarrier is arranged in the DC component. According to various embodiments, a frequency band consists of at least one subcarrier.

If it is determined that no subcarrier is arranged in the DC component, the electronic device may determine, at operation 630, a local frequency based on the starting and ending frequencies of the frequency band. For example, if no subcarrier is arranged in the DC component, the local frequency may be determined by dividing the sum of the starting and ending frequencies of the frequency band by 2.

According to an embodiment, if it is determined that a subcarrier is arranged in the DC component, the electronic device may determine, at operation 640, a frequency between a first subcarrier and a second subcarrier closest to the first subcarrier as the local frequency. According to various embodiments, the first subcarrier may be the subcarrier located at the center of the frequency band. For example, assuming a frequency band consisting of 7 subcarriers, the first subcarrier may be the subcarrier located at the fourth place in the frequency band.

According to an embodiment, if it is determined at operation 610 that the number of frequency bands in use for communication is 2, the electronic device may determine at operation 650 whether the center frequency falls within a first frequency band or a second frequency band. According to various embodiments, the first frequency band may be below the second frequency band.

According to an embodiment, if it is determined that the center frequency does not fall within either the first frequency band or the second frequency band, the electronic device may determine, at operation 660, the local frequency based on the starting frequency of the first frequency band and the ending frequency of the second frequency band. According to various embodiments, the center frequency may be determined by dividing the sum of the starting frequency of the first frequency band and the ending frequency of the second frequency band.

According to an embodiment, if it is determined that the center frequency falls within the first frequency band or the second frequency band, the electronic device may determine at operation 670 whether the center frequency falls within the first frequency band.

According to various embodiments, if it is determined that the center frequency does not fall within the first frequency band (i.e., if the center frequency falls within the second frequency band), the electronic device may determine, at operation 680, the starting frequency of the second frequency band as the local frequency. For example, if the second frequency band ranges from 1.5 GHz to 1.8 GHz, the electronic device may determine the frequency of 1.5 GHz as the local frequency.

According to an embodiment, if it is determined that the center frequency falls within the first frequency band, the electronic device may determine, at operation 690, the ending frequency of the first frequency band as the local frequency. For example, if the first frequency band ranges from 1 GHz to 1.2 GHz, the electronic device may determine the frequency of 1.2 GHz as the local frequency.

The flowchart of FIG. 6 illustrates just an exemplary embodiment of the local frequency determination procedure. Accordingly, the scope of the disclosure should not be limited to the flowchart of FIG. 6. Although the embodiment of FIG. 6 is directed to the case where two frequency bands (first and second frequency bands) are used for communication, three or more frequency bands can be used for communication, and the algorithm proposed in the disclosure can be applied for communication using the three or more frequency bands.

Figure 7:
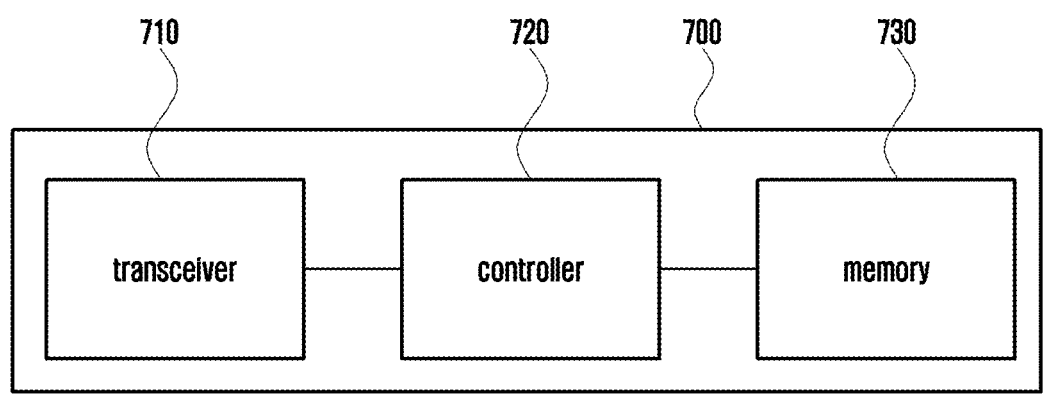
FIG. 7 illustrates a block diagram of a configuration of an electronic device according to a disclosed embodiment.

FIG. 7 illustrates a block diagram of a configuration of an electronic device according to a disclosed embodiment.

According to an embodiment, the electronic device 700 may include a transceiver 710, a controller 720, and a memory 730. According to various embodiments, the electronic device 700 may transmit/receive signals by means of the transceiver 710.

According to an embodiment, the controller 720 may be electrically connected with the transceiver 710 and it may identify frequency bands in use for communication, identify, if it is identified that only one frequency band (e.g., first frequency) is used for communication, the subcarrier located at the center of the frequency band among multiple subcarriers constituting the frequency band as a first subcarrier, and determine a frequency between the first subcarrier and a second subcarrier closest to the local frequency.

According to an embodiment, the memory 730 may be electrically connected with the controller 720 and it may store information generated by the controller or transmitted/received by the transceiver 710.

According to an embodiment, a method for determining a local frequency in a wireless communication system may include identifying frequency bands in use for communication, identifying, based on a first frequency band being in use for communication, a first subcarrier located at the center of the first frequency band among multiple subcarriers constituting the first frequency band, and determining a frequency between the first subcarrier and a second subcarrier closest to the first subcarrier as the local frequency.

According to an embodiment, determining the local frequency may include determining the local frequency based on a starting frequency of the first frequency band and an ending frequency of the first frequency band in the case where no subcarrier is arranged in a direct current (DC) component of the first frequency band and determining the frequency between the first and second subcarriers as the local frequency in the case where a subcarrier is arranged in the DC component of the first frequency band.

According to an embodiment, the local frequency may be determined by Equation 4 in the case where a subcarrier is arranged in the DC component of the first frequency band, Equation 4:

$$f_{LO}=(f_1+f_2)/2\pm(S/2)*n$$

where $f_{LO}$ denotes the local frequency, $f_1$ denotes the starting frequency of the first frequency band, $f_2$ denotes the ending frequency of the first frequency band, S denotes a subcarrier spacing, and n denotes an integer.

According to an embodiment, the method may further include identifying, based on the first frequency band and a second frequency band being in use for communication, a frequency located at a center of a frequency range across the first and second frequency bands and determining the frequency located at the center of the frequency range as the local frequency.

According to an embodiment, the first frequency band may be below the second frequency band, and the frequency located at the center of the frequency range may be identified based on a starting frequency of the first frequency band and an ending frequency of the second frequency band.

According to an embodiment, the first frequency band may be below the second frequency band, and determining the frequency located at the center of the frequency range as the local frequency may include determining whether the frequency located at the center of the frequency range falls within the first frequency band and determining an ending frequency of the first frequency band as the local frequency based on the frequency located at the center of the frequency range falling within the first frequency band.

According to an embodiment, the method further includes determining the frequency located at the center of the frequency range as the local frequency based on the frequency located at the center of the frequency range not falling within the first frequency band.

According to an embodiment, the first frequency band may be below the second frequency band, and determining the frequency located at the center of the frequency range as the local frequency may include determining whether the frequency located at the center of the frequency range falls within the second frequency band and determining a starting frequency of the second frequency band as the local frequency based on the frequency located at the center of the frequency range falling within the second frequency band.

According to an embodiment, the method may further include determining the frequency located at the center of the frequency range as the local frequency based on the frequency located at the center of the frequency range not falling within the second frequency band.

According to an embodiment, the wireless communication system may be a $5^{th}$ generation (5G) mobile communication system.

According to an embodiment, an electronic device may include a transceiver; a controller electrically connected with the transceiver and configured to identify frequency bands in use for communication, identify, based on a first frequency band being in use for communication, a first subcarrier located at the center of the first frequency band among multiple subcarriers constituting the first frequency band, and determine a frequency between the first subcarrier and a second subcarrier closest to the first subcarrier as the local frequency; and a memory electrically connected with the controller and configured to store information generated by the controller or transmitted or received by the transceiver.

According to an embodiment, the controller may be configured to determine the local frequency based on a starting frequency of the first frequency band and an ending frequency of the first frequency band in the case where no subcarrier is arranged in a direct current (DC) component of the first frequency band and determine the frequency between the first and second subcarriers as the local frequency when a subcarrier is arranged in the DC component of the first frequency band.

According to an embodiment, the local frequency may be determined by Equation 5 in the case where a subcarrier is arrange in the DC component of the first frequency band, Equation 5:

$$f_{LO}=(f_1+f_2)/2\pm(S/2)*n$$

where $f_{LO}$ denotes the local frequency, $f_1$ denotes the starting frequency of the first frequency band, $f_2$ denotes the ending frequency of the first frequency band, S denotes a subcarrier spacing, and n denotes an integer.

According to an embodiment, the controller may be configured to identify, based on the first frequency band and a second frequency band being in use for communication, a frequency located at a center of a frequency range across the first and second frequency bands and determine the frequency located at the center of the frequency range as the local frequency.

According to an embodiment, the first frequency band may be below the second frequency band, and the controller may be configured to identify the frequency located at the center of the frequency range based on a starting frequency of the first frequency band and an ending frequency of the second frequency band.

According to an embodiment, the first frequency band may be below the second frequency band, and the controller may be configured to determine whether the frequency located at the center of the frequency range falls within the first frequency band and determine an ending frequency of the first frequency band as the local frequency based on the frequency located at the center of the frequency range falling within the first frequency band.

According to an embodiment, the controller may be configured to determine the frequency located at the center of the frequency range as the local frequency based on the frequency located at the center of the frequency range not falling within the first frequency band.

According to an embodiment, the first frequency band may be below the second frequency band, and the controller may be configured to determine whether the frequency located at the center of the frequency range falls within the second frequency band and determine a starting frequency of the second frequency band as the local frequency based on the frequency located at the center of the frequency range falling within the second frequency band.

According to an embodiment, the controller may be configured to determine the frequency located at the center of the frequency range as the local frequency based on the frequency located at the center of the frequency range not falling within the second frequency band.

According to an embodiment, the wireless communication system may be a $5^{th}$ generation (5G) mobile communication system.

As described above, the local frequency determination method and apparatus of the disclosed embodiments is advantageous in terms of avoiding the signal distortion effect caused by arranging the local frequency at the center of a subcarrier. The local frequency determination method and apparatus of the disclosed embodiments is also advantageous in terms of improving digital radio communication quality by reducing the error vector magnitude of a signal.

The local frequency determination method and apparatus of the disclosed embodiments is also advantageous in terms of making it possible to apply a sampling rate of a digital path efficiently by determining a local frequency flexibly in a wireless communication system supporting multiple frequency bands.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by an electronic device for determining a local frequency in a wireless communication system, the method comprising:
    identifying, by a controller of the electronic device, frequency bands in use for communication;
    identifying, by the controller, based on a first frequency band being in use for communication, a first subcarrier located at a center of the first frequency band among multiple subcarriers constituting the first frequency band;
    identifying, by the controller, based on the first frequency band and a second frequency band being in use for communication, a frequency located at a center of a frequency range across the first and second frequency bands;
    determining, by the controller, whether a number of subcarriers constituting the first frequency band is odd or even;
    determining, by the controller, whether the frequency located at the center of the frequency range falls within the second frequency band;
    in a case where the second frequency band is not in use and the number of subcarriers constituting the first frequency band is odd, determining, by the controller, a frequency between the first subcarrier and a second subcarrier closest to the first subcarrier as the local frequency;
    in a case where the second frequency band is in use and the frequency located at the center of the frequency range does not fall within the second frequency band, determining, by the controller, the frequency located at the center of the frequency range as the local frequency; and
    in a case where the second frequency band is in use and the frequency located at the center of the frequency range falls within the second frequency band, determining, by the controller, a starting frequency of the second frequency band as the local frequency based on the frequency located at the center of the frequency range falling within the second frequency band.

2. The method of claim 1, wherein:
    in a case that the number of subcarriers constituting the first frequency band is even, determining, by the controller, the local frequency based on a starting frequency of the first frequency band and an ending frequency of the first frequency band when no subcarrier is arranged in a direct current (DC) component of the first frequency band; and
    in a case that the number of subcarriers constituting the first frequency band is odd, determining, by the controller, the frequency between the first and second subcarriers as the local frequency when a subcarrier is arranged in the DC component of the first frequency band.

3. The method of claim 2, wherein when a subcarrier is arranged in the DC component of the first frequency band, the local frequency is determined by the controller according to:

$$f_{LO}=(f_1+f_2)/2\pm(S/2)*n$$

where $f_{LO}$ denotes the local frequency, $f_1$ denotes the starting frequency of the first frequency band, $f_2$ denotes the ending frequency of the first frequency band, S denotes a subcarrier spacing, and n denotes an integer.

4. The method of claim 1, wherein:
    the first frequency band is below the second frequency band; and
    the frequency located at the center of the frequency range is identified, by the controller, based on a starting frequency of the first frequency band and an ending frequency of the second frequency band.

5. The method of claim 1, wherein:
    the first frequency band is below the second frequency band; and
    determining, by the controller, the frequency located at the center of the frequency range as the local frequency comprises:
        determining, by the controller, whether the frequency located at the center of the frequency range falls within the first frequency band; and
        determining, by the controller, an ending frequency of the first frequency band as the local frequency based on the frequency located at the center of the frequency range falling within the first frequency band.

6. The method of claim 5, further comprising determining, by the controller, the frequency located at the center of the frequency range as the local frequency based on the frequency located at the center of the frequency range not falling within the first frequency band.

7. The method of claim 1, wherein the wireless communication system is a 5$^{th}$ generation (5G) mobile communication system.

8. An electronic device, comprising:
    a transceiver;
    a controller electrically connected with the transceiver and configured to:
        identify frequency bands in use for communication,
        identify, based on a first frequency band being in use for communication, a first subcarrier located at a center of the first frequency band among multiple subcarriers constituting the first frequency band,
        identify, based on the first frequency band and a second frequency band being in use for communication, a frequency located at a center of a frequency range across the first and second frequency bands,
        determine whether a number of subcarriers constituting the first frequency band is odd or even,
        determine whether the frequency located at the center of the frequency range falls within the second frequency band,
        in a case where the second frequency band is not in use and the number of subcarriers constituting the first frequency band is odd, determine a frequency between the first subcarrier and a second subcarrier closest to the first subcarrier as a local frequency,
        in a case where the second frequency band is in use and the frequency located at the center of the frequency range does not fall within the second frequency band, determine the frequency located at the center of the frequency range as the local frequency, and in a case where the second frequency band is in use and the frequency located at the center of the frequency range falls within the second frequency band, determine a starting frequency of the second frequency band as the local frequency based on the frequency located at the center of the frequency range falling within the second frequency band; and a memory electrically connected with the controller and configured to store information generated by the controller or transmitted or received by the transceiver.

9. The electronic device of claim 8, wherein the controller is configured to:

in a case that the number of subcarriers constituting the first frequency band is even, determine the local frequency based on a starting frequency of the first frequency band and an ending frequency of the first frequency band when no subcarrier is arranged in a direct current (DC) component of the first frequency band; and in a case that the number of subcarriers constituting the first frequency band is odd, determine the frequency between the first and second subcarriers as the local frequency when a subcarrier is arranged in the DC component of the first frequency band.

10. The electronic device of claim 9, wherein when a subcarrier is arranged in the DC component of the first frequency band, the local frequency is determined according to:

$$f_{LO} = (f_1 + f_2)/2 \pm (S/2)*n$$

where $f_{LO}$ denotes the local frequency, $f_1$ denotes the starting frequency of the first frequency band, $f_2$ denotes the ending frequency of the first frequency band, S denotes a subcarrier spacing, and n denotes an integer.

11. The electronic device of claim 8, wherein:

the first frequency band is below the second frequency band; and the controller is configured to identify the frequency located at the center of the frequency range based on a starting frequency of the first frequency band and an ending frequency of the second frequency band.

12. The electronic device of claim 8, wherein:

the first frequency band is below the second frequency band; and the controller is configured to:

determine whether the frequency located at the center of the frequency range falls within the first frequency band, and determine an ending frequency of the first frequency band as the local frequency based on the frequency located at the center of the frequency range falling within the first frequency band.

13. The electronic device of claim 12, wherein the controller is configured to determine the frequency located at the center of the frequency range as the local frequency based on the frequency located at the center of the frequency range not falling within the first frequency band.

14. The electronic device of claim 8, wherein the electronic device is connected to a $5^{th}$ generation (5G) mobile communication system.

* * * * *